Patented Mar. 27, 1945

2,372,234

UNITED STATES PATENT OFFICE 2,372,234

METHOD OF OBTAINING SUBSTANTIALLY PURE INTERSTITIAL-CELL STIMULATING HORMONE

Harry V. van Dyke and Roy O. Greep, Stelton, and Bacon F. Chow, Highland Park, N. J., assignors to E. R. Squibb & Sons, New York, N. Y., a corporation of New York No Drawing. Application June 4, 1941,
Serial No. 396,538

7 Claims. (Cl. 167—74)

This application is a continuation-in-part of our application Serial No. 322,340, filed March 5, 1940, now Patent No. 2,356,803, dated Aug. 29, 1944.

This invention relates to the interstitial-cell-stimulating hormone of the anterior lobe of the pituitary gland (also commonly called the luteinizing hormone of the anterior lobe of the pituitary gland), which is hereinafter referred to for convenience as the "interstitial-cell-stimulating hormone."

It is an object of this invention to provide substantially pure interstitial-cell-stimulating hormone, and a method of obtaining it; and it is a further object to provide the interstitial-cell-stimulating hormone in the form of a pure protein, and a method of obtaining the hormone in such form.

The term "gametogenic hormone" is used hereinafter to designate the gametogenic hormone of the anterior lobe of the pituitary gland (also commonly called the follicle-stimulating hormone of the anterior lobe of the pituitary gland); and the term "gonad-stimulating hormones" is used hereinafter to designate the hormone mixture essentially comprising the interstitial-cell-stimulating and gametogenic hormones.

The prior methods of obtaining the interstitial-cell-stimulating hormone from the gonad-stimulating hormones have been unsatisfactory, particularly from the standpoint of efficiency and completeness of separation. It has been found that the interstitial-cell-stimulating hormone and the gametogenic hormone are mutually distinct, biologically, physically, and chemically, a fact not clearly shown by prior investigators. By making use of this fact, we have developed a method of obtaining the interstitial-cell-stimulating hormone from the gonad-stimulating hormones in a single operation without serious loss, and of obtaining this hormone more than 99% pure in terms of gametogenic hormone (i. e., containing less than 1% of the latter), as indicated by biological assays in hypophysectomized immature rats. We have developed further a method of obtaining the substantially pure interstitial-cell-stimulating hormone in the form of a pure protein.

The practice of this invention essentially comprises treating an aqueous solution of purified gonad-stimulating hormones with an appropriate quantity of acetate buffer to produce an about ¼-molar solution of the buffer (or equivalent pH regulator), and with an appropriate quantity of salting-out salt to precipitate the interstitial-cell-stimulating hormone, the gametogenic hormone remaining in solution. By "salting-out salt" is meant, of course, a highly-soluble salt capable of precipitating proteins from aqueous solutions thereof; which salts comprise, inter alia, sodium acetate, magnesium sulfate, potassium citrate, potassium acid phthalate, sodium chloride, and, notably, sodium sulfate and ammonium sulfate.

The aqueous solution of purified bonad-stimulating hormones is preferably obtained as described and claimed in our application Serial No. 322,340 (now Patent No. 2,356,803).

The thus-obtained interstitial-cell-stimulating hormone may—in accordance with this invention—be obtained in the form of a pure protein by adding an appropriate quantity of a salting-out salt to a concentrated aqueous solution of the hormone to make an about one-third-saturated solution of the salt, adjusting the pH to about 7.3–7.4, removing the precipitate—preferably, repeating the precipitation until the desired purification is obtained—dissolving the final precipitate in water, and dialyzing the solution free of salting-out salt.

The interstitial-cell-stimulating hormone is a valuable therapeutic agent for the obtention of its specific physiological effect in medical situations requiring it. Thus, in any disease due to or complicated by deficiency of secretion of the interstitial cells of the testes or the similar cells of the ovaries together with the related lutein cells, the interstitial-cell-stimulating hormone would be expected to correct the deficiency; and this hormone might also maintain spermatogenesis in the male by facilitating the formation of androgen.

The following examples are illustrative of the invention:

*Example 1*

8.7 kg. fresh (frozen) hog-pituitary glands are ground and suspended in 44 liters of a 2% aqueous solution of sodium chloride and extracted at a temperature slightly above freezing. After vigorously stirring for about 2 hours, the suspension is allowed to stand in a cold place for 12–16 hours. The pH of diluted aliquot samples is adjusted by means of N/70 HCl to the point of maximum precipitation as shown by the tube containing the minimum concentration of nitrogen in the supernatant; and the calculated amount of N/1 HCl is added to the large batch, and its pH is lowered to within 0.05 of that of maximum precipitation, usually lying in the range 4.5-4.8. The mixture is finally centrifuged, and the supernatant is collected in a large vessel; the precipitate is washed twice with a cold 2% NaCl solution, about 15 liters being used for each washing; the supernatant and washings are then combined, and to each liter of fluid is added 660 grams of solid ammonium sulfate; and the suspension is permitted to stand at room temperature for 12-16 hours and is filtered on fluted paper. The precipitate is then dialyzed in a refrigerator against distilled water (ammonium sulfate being removed and the active fraction of the precipitate going into solution); when free from ammonium sulfate, the solution is centrifuged to remove the black sediment, which is relatively rich in chromatosome-dispersing hormone. To the supernatant and the washings of the black material is added N/1 NaOH to precipitate some inert protein (the amount of alkali necessary to effect maximum precipitation being first determined in small aliquot samples in the manner described above), the pH at which the maximum precipitation occurs being approximately 5.10. After centrifuging and washing the inactive precipitate with water, the combined supernatants, which contain most of the activity, are made ⅓-saturated with ammonium sulfate; and the precipitate insoluble at this saturation is centrifuged after standing at room temperature for 12-16 hours, and washed twice with ⅓-saturated ammonium sulfate solution. This precipitate also is inactive. The pH of the combined supernatant and washings is lowered to about 4.2 by means of N/1 $H_2SO_4$ in ⅓-saturated ammonium sulfate solution. A portion of the inert protein precipitates. After standing at room temperature for about two hours, the precipitate is removed by centrifuging. The precipitate is washed twice with ⅓-saturated ammonium sulfate solution, and the combined supernatant and washings are then brought to full saturation with ammonium sulfate; and the precipitate is filtered and dialyzed, and the filtrate discarded. When the dialyzed solution (the solution of the precipitate resulting on removal of ammonium sulfate) is free from sulfate, it is so diluted that the final solution contains about 4.0 mg. of protein N per cc. To this protein solution is added an equal volume of saturated ammonium sulfate solution, and the pH of the mixture is again brought to about 4.2, at which a voluminous precipitation of inactive protein occurs. After standing at room temperature for about two hours, the inert precipitate is removed by centrifuging and washed with half-saturated ammonium sulfate solution. The combined solution is made 0.9-saturated with ammonium sulfate by the addition of the solid salt, and the precipitated protein is then filtered and dialyzed until free from sulfate.

The salt-free solution thus obtained contains almost the entire amount of the gonad-stimulating hormones present in the pituitary glands. The separation of the component interstitial-cell-stimulating and gametogenic hormones is achieved by the following procedure. To the protein solution is added an equal volume of 1.0 M acetate buffer of pH 4.43, and then two volumes of 41% sodium sulfate. The precipitated protein is almost pure interstitial-cell-stimulating hormone, and may be further purified to a high degree by repeating the process of precipitation (three or four times) until the dissolved protein nitrogen is constant (0.025 mg. per cc.).

The interstitial-cell-stimulating hormone is assayed in hypophysectomized immature male and female rats. In both sexes it stimulates the interstitial cells; and in males it causes testicular hypertrophy and enlargement of the anterior lobe of the prostate. A dose having a detectable gonadotropic effect in immature hypophysectomized rats is equivalent to 0.002 mg. of nitrogen or less. A dose of 0.360 mg. (equivalent to at least 180 times the minimal effective dose) of interstitial-cell-stimulating hormone causes no detectable follicle-stimulating effect.

The interstitial-cell-stimulating hormone as a saturated solution in an aqueous 0.25 M acetate buffer solution having a pH of 4.43, and containing 20.5% sodium sulfate, has a constant solubility equivalent to about 0.025 mg. of nitrogen per cc. By "constant solubility" is meant, of course, a solubility which does not vary with increase of the quantity of the solid phase to many times that required to saturate the solvent.

*Example 2*

The substantially pure interstitial-cell-stimulating hormone obtained by the procedure of the foregoing example is further treated as follows, to obtain it in the form of a pure protein: Ammonium sulfate is added to a concentrated aqueous solution of the substantially pure interstitial-cell-stimulating hormone to one-third saturation, and the pH is adjusted to 7.3-7.4 (as measured by glass electrode). The solvent is separated from the resulting precipitate by centrifugation, and removed; and the precipitate is dissolved in water, saturated ammonium sulfate solution equal to one-half of the volume of water used is then added, and the pH again adjusted to 7.3-7.4. These steps are repeated seven times, and the final precipitate is dissolved in a small volume of water, and the solution dialyzed free from ammonium sulfate. (The supernatant fluids contain a considerable quantity of interstitial-cell-stimulating hormone and may be treated for further recovery.)

The thus-obtained product is a pure protein, as evidenced by the following physicochemical tests: It appears as a single component in electrophoretic analysis of solutions having different pH values, with mobilities of $-3.85 \times 10^{-5}$ at pH 4.58, $-2.01 \times 10^{-5}$ at pH 6.21, and $0.66 \times 10^{-5}$ at pH 7.86; it behaves like a homogeneous substance in the ultracentrifuge; and in a solvent composed of 0.25 M acetate buffer (pH 4.35) containing 21.05% sodium sulfate, a saturated solution of the protein contained 0.018 mg. N per cc., whether the solution was just saturated or the amount of protein suspended in the solvent was nearly sixteen times the saturating concentration.

The protein is also characterized by the following: its average sedimentation constant in a 1% NaCl solution is $S_{20} = 5.39 \times 10^{-13}$, with a maximum deviation from the average of ±1%; its diffusion constant, determined in a cacodylate solution of pH 6.2, is $D^{20} \cong 5.9 \times 10^{-7}$, this value decreasing with time; its molecular weight (calculated from these data and assuming a value of 0.749 for the specific volume of the protein) is approximately 90,000; its isoelectric point is pH 7.45; and its elementary analysis is:

|   | Per cent |
|---|---|
| C | 49.37 |
| H | 6.83 |
| N | 14.93 |
| Ash | 0.93 |

The (pure protein) hormone is assayed in hypophysectomized immature rats. It stimulates the interstitial tissue of the testes or ovary, and causes the formation of corpora lutea, provided that maturing follicles are present. Its minimal effective total dose in hypophysectomized immature male rats is about 1 microgram N, or 6.7 micrograms of the hormone.

The substantially pure interstitial-cell-stimulating hormone—especially when in the form of a pure protein—has the extra advantage that a solution thereof of the desired potency may be readily prepared by merely mixing measured quantities of the hormone and solvent.

The invention may be variously otherwise embodied within the scope of the appended claims.

We claim:

1. The method of isolating substantially pure interstitial-cell-stimulating hormone which comprises treating an aqueous solution of the gonad-stimulating hormones of the pituitary gland with an appropriate quantity of acetate buffer to produce an about ¼-molar solution of the buffer and with an appropriate quantity of a salting-out salt to make an about 20% solution of the salt, separating the precipitated interstitial-cell-stimulating hormone, and repeating this precipitation procedure on an aqueous solution of the interstitial-cell-stimulating hormone until the hormone has a constant solubility.

2. The method of purifying the interstitial-cell-stimulating hormone of the anterior lobe of the pituitary gland which comprises adding an appropriate quantity of a salting-out salt to a concentrated aqueous solution of the substantially pure interstitial-cell-stimulating hormone to make an about one-third-saturated solution of the salt, adjusting the pH to about 7.3–7.4, removing the precipitate, dissolving the precipitate in water, and dialyzing this solution free of salting-out salt.

3. The method of obtaining the interstitial-cell-stimulating hormone in the form of a pure protein which comprises treating an aqueous solution of the gonad-stimulating hormones of the pituitary gland with an appropriate quantity of acetate buffer to produce an about ¼-molar solution of the buffer and with an appropriate quantity of salting-out salt to make an about 20% solution of the salt, separating the precipitated hormone, and further purifying this hormone by isoelectric precipitation.

4. The method of obtaining the interstitial-cell-stimulating hormone of the anterior lobe of the pituitary gland in the form of a pure protein which comprises adding an appropriate quantity of a salting-out salt to a concentrated aqueous solution of the substantially pure interstitial-cell-stimulating hormone to make an about one-third-saturated solution of the salt, adjusting the pH to about 7.3–7.4, removing the precipitate, repeating the precipitation until the desired purification is obtained, dissolving the final precipitate in water, and dialyzing this solution free of salting-out salt.

5. The method of separating the interstitial-cell-stimulating and gametogenic hormones of the anterior lobe of the pituitary gland from each other which comprises treating an aqueous solution of these gonad-stimulating hormones with an appropriate quantity of acetate buffer to produce an about ¼-molar solution of the buffer and with an appropriate quantity of a salting-out salt to make an about 20% solution of the salt, and separating the precipitated interstitial-cell-stimulating hormone.

6. A product obtained by treating an aqueous solution of the gonad-stimulating hormones of the pituitary gland with an appropriate quantity of acetate buffer to produce an about ¼-molar solution of the buffer and with an appropriate quantity of a salting-out salt to make an about 20% solution of the salt, separating the precipitated interstitial-cell-stimulating hormone, and repeating this precipitation procedure on an aqueous solution of the interstitial-cell-stimulating hormone until the hormone has a constant solubility.

7. A product obtained by making a concentrated aqueous solution of the substantially pure interstitial-cell-stimulating hormone of the anterior lobe of the pituitary gland, adding an appropriate quantity of a salting-out salt to make an about one-third-saturated solution of the salt, adjusting the pH to about 7.3–7.4, removing the precipitate, repeating the precipitation until the hormone is obtained in the form of a single protein, dissolving the final precipitate in water, and dialyzing this solution free of salting-out salt.

HARRY B. VAN DYKE.
ROY O. GREEP.
BACON F. CHOW.